Figure 1:
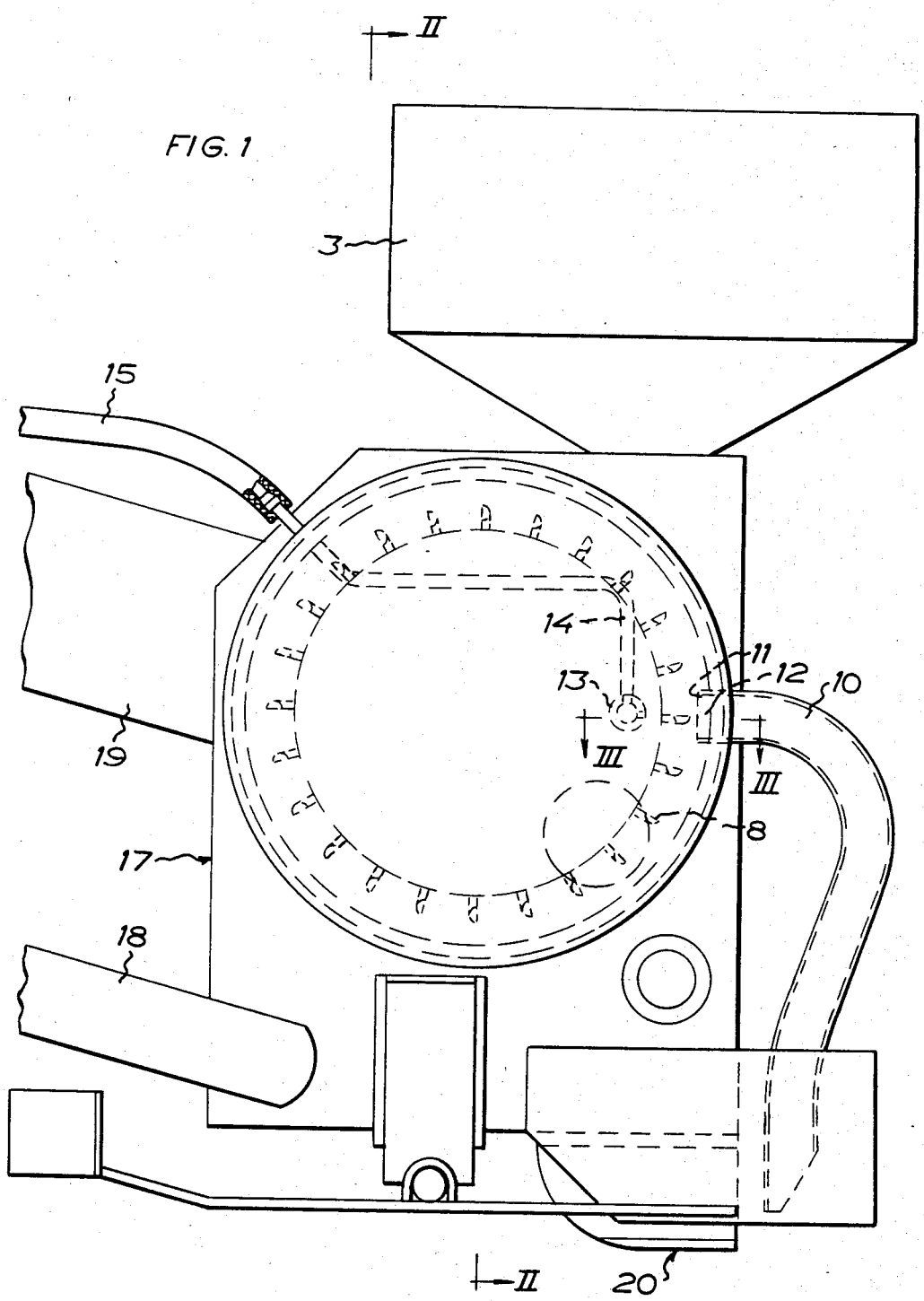

United States Patent [19]

Andersson

[11] Patent Number: 4,516,690
[45] Date of Patent: May 14, 1985

[54] APPARATUS FOR PLANTING SEEDS IN DRILLS AT PREDETERMINED INTERVALS

[76] Inventor: Alf H. Andersson, Box 23, Ödåkra, Sweden

[21] Appl. No.: 414,346
[22] PCT Filed: Dec. 18, 1981
[86] PCT No.: PCT/SE81/00380
§ 371 Date: Aug. 10, 1982
§ 102(e) Date: Aug. 10, 1982
[87] PCT Pub. No.: WO82/02142
PCT Pub. Date: Jul. 8, 1982

[30] Foreign Application Priority Data
Dec. 19, 1980 [SE] Sweden .................. 8008973

[51] Int. Cl.³ ............................................. A01C 7/04
[52] U.S. Cl. ................................. 221/233; 221/266; 221/278
[58] Field of Search ................. 221/233, 266, 278

[56] References Cited
U.S. PATENT DOCUMENTS
2,737,314  3/1956  Anderson ................. 221/233 X
2,855,125  10/1958  Grimsbo ..................... 221/266
4,162,744  7/1979  Barker et al. ............. 221/266 X FOREIGN PATENT DOCUMENTS
2346496  3/1974  Fed. Rep. of Germany .
2401306  7/1974  Fed. Rep. of Germany .
2517758  11/1976  Fed. Rep. of Germany .
1457515  9/1966  France ..................... 221/266
2376608  4/1978  France .
300326  4/1968  Sweden .
906281  9/1962  United Kingdom .

Primary Examiner—F. J. Bartuska
Attorney, Agent, or Firm—Shapiro and Shapiro

[57] ABSTRACT

An apparatus for planting seeds in drills at predetermined intervals is adapted to transport the seeds one by one by means of spoons (8) from a seed store to an outlet duct (10). To ensure a reliable, selective discharge of the seeds from the spoons (8), a compressed-air nozzle (13) is arranged to direct a flow of compressed air from a location opposite the inlet opening (11) of the outlet duct (10) towards each individual spoon (8) as it passes between the nozzle and the inlet opening (11).

1 Claim, 4 Drawing Figures

APPARATUS FOR PLANTING SEEDS IN DRILLS AT PREDETERMINED INTERVALS

The present invention relates to an apparatus for planting seeds in drills at predetermined intervals, comprising a housing with a seed store and movable spoons which are adapted each to pick up one seed in the seed store and to consecutively discharge the seed in an outlet duct.

As disclosed in SE published application No. 300,326, a seed planting assembly has a series of spoons which are arranged on a disc which is rotatable in a vertical plane and whose lower portion forms a wall in a seed store. When the spoons during the rotation of the disc pass through the seed store, they will each entrain one seed or a certain quantity of seeds. The spoons travel over a duct leading to the ground and, when passing over the duct, are titled such that the seeds drop into the duct and pass through it to the ground. Since the individual seeds will drop from the spoons at different angles of tilting thereof, the seeds will leave the spoons in different positions thereof above the duct. Hence, in seed planting assemblies of this design the intervals between the individual seeds will vary to a considerable extent. Moreover, the means for tilting the spoons in seeders of this type are bulky, which means that the overall width of the assembly will become substantial, this in turn entailing that the minimum distance between the drills will become relatively large.

In a device as disclosed in SE published application No. 414,988, the spoons, as in the above-mentioned device, pass a seed store and each picks up one seed. under the joint action of gravity and centrifugal force, the seeds are caused to leave the spoons and are flung into a duct which leads to the ground. For its operation, the apparatus depends upon the speed of rotation of the spoon-carrying wheel, this speed in turn depending on the rate at which the plant seeding assembly is advanced.

The object of the present invention is, while using a spoon system as described above, ensuring gentle handling of the seeds, to increase the accuracy of the seed planting assembly to a considerable extent and to improve operational reliability. According to the invention, this object is achieved in that means are provided for selectively transporting the seed from the spoon to the outlet duct by means of compressed air.

"Compressed air"]in the following description and in the claims refers to air with a relatively slight overpressure, i.e. in principle a weak jet of air.

Figure 2:
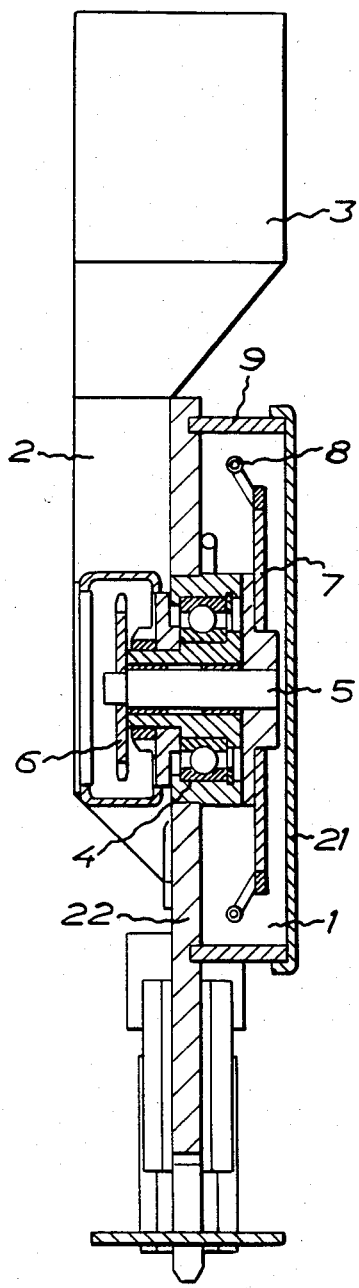
Figure 4:
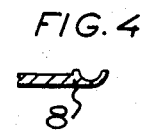
Figure 3:
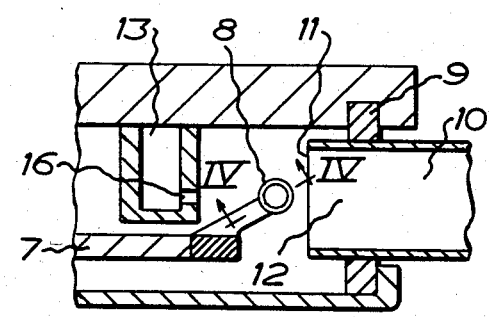

The invention will be described in greater detail herebelow with reference to the accompanying drawings showing one embodiment and in which FIG. 1 shows a seed planting assembly according to the invention, FIG. 2 is a section taken along the line II—II in FIG. 1, FIG. 3 is a section taken along the line III—III in FIG. 1, and FIG. 4 shows a spoon 8 in sectional view taken along the line IV—IV in FIG. 3.

In FIG. 1 of the drawings, reference numeral 17 generally designates a seed planting assembly which may be of a conventional design and be connected to the chassis of the seed planting machine by support means 18 and 19. At its lower portion, the assembly 17 has a device 20 which is in contact with the ground and which may also be of a conventional design. The seed planting assembly has a supporting plate 22 on which a cylinder wall 9 is fixed along one of its base surfaces. The cylinder wall 9 has a cover 21 extending over the opposite base surface, and it is apparent that the plate 22, the cylinder 9 and the cover 21 together define a chamber 1. A channel 2 extending from a seed store tank 3 opens in the cylinder wall 9. A shaft 5 centrally disposed in the chamber 1 is rotatably mounted in the plate 22 as shown at 4. The shaft 5 extends through the plate 22 and carries on its end remote from the chamber 1 a sprocket wheel 6 with which a chain engages to rotate the shaft 5 and a circular wheel 7 mounted on the end of the shaft that is located in the chamber. Spoons 8 are fixed around the periphery of the wheel 7 in such a manner that they project obliquely out from the wheel periphery as will be appreciated from FIG. 1. A spoon 8 is shown in section in FIG. 4.

Through the cylinder wall 9 of the chamber 1 extends an outlet duct 10 in the form of a bent tube with a horizontal inlet portion 11 extending slightly into the chamber 1, and a vertical outlet portion adjacent the device 20 contacting the ground. An air nozzle 13 is mounted on the plate 22 horizontally opposite the inlet portion 11 and is connected to a conduit 14 which in turn is connected to a hose 15 communicating with a source of compressed air. The nozzle 13 has a horizontally oriented outlet 16 which is narrow to produce a jet of air towards the inlet portion 11 of the outlet duct 10. As appears from FIG. 1, the nozzle 13 is spaced a certain distance from the inlet portion 11, and the spoons 8 mounted on the wheel 7 travel in the space defined between the nozzle 13 and the inlet portion 11.

In the operation of the apparatus described above for drilling seeds at predetermined intervals, the seeds are first placed in the store tank 3. The seeds will then drop through the channel 2 to the bottom of the chamber 1. The seeds will collect on the bottom of the chamber in such an amount that the spoons on rotation of the wheel 7 will travel through the bulk of seeds and each pick up one seed. The spoons 8 will then rise from the bulk of seeds and reach the space between the nozzle 13 and the inlet 11 of the outlet duct 10 where they are exposed to a stream of air from the outlet opening 16 of the nozzle 13. Experimentally, it has been established that at an air pressure of slightly below 1 kg/cm$^2$ gauge pressure and with a nozzle diameter of 1.5 mm, all the spoons 8 will discharge their load when passing through the air stream from the nozzle 13, even in the case where the seeds are large and relatively heavy. The spoons pass through the jet of air from the nozzle 13 with an angle of rotation of the wheel 7 that is very small in relation to the angular distance between two adjacent spoons 8, thereby making the discharge of seeds very even and uniform, and since the rest of the seed transport is conducted by means of the well-tried spoon system which in this instance has only one mobile part, the operation of the apparatus is most reliable.

As indicated above, the feed of compressed air forms a weak jet of air which normally is continuous but which may of course be activated only when a spoon is located opposite the nozzle, by means of a suitable synchronizer. Instead of a nozzle, it is possible to use spoons with hollow handles or the like through which the compressed air is supplied when the spoon passes the outlet opening.

I claim:

1. An apparatus for planting seeds in drills at predetermined intervals, comprising a housing, a seed store in said housing, a wheel rotatably mounted in a vertical plane in said housing, said wheel having a plurality of spoons fixed in succession along the periphery of the wheel and disposed to pass through said seed store and to move upwardly therefrom, each spoon having a concave surface configured and oriented to pick up one seed from said seed store as the spoon moves through the seed store with said surface facing substantially outwardly away from one side of the wheel and to lift the seed to a position at said one side of the wheel, at which said surface faces substantially upwardly, with the seed supported on the surface by gravity, an outlet duct having an inlet portion in said housing at said position, and means including a nozzle connected to a source of compressed air and disposed opposite to and spaced from said inlet portion for providing a jet of compressed air directed toward said inlet portion, said wheel being disposed relative to said nozzle and said inlet portion such that each spoon moves upwardly into the space between said nozzle and said inlet portion at said position for causing the seed supported on the spoon to be transported into said inlet portion by said jet of compressed air.

* * * * *